US012508352B2

(12) United States Patent
Nilsson et al.

(10) Patent No.: US 12,508,352 B2
(45) Date of Patent: Dec. 30, 2025

(54) PERITONEAL DIALYSIS CYCLER HAVING DECREASED pH DISINFECTION

(71) Applicants: BAXTER INTERNATIONAL INC., Deerfield, IL (US); BAXTER HEALTHCARE SA, Glattpark (CH)

(72) Inventors: Markus Nilsson, Lund (SE); Michael Pettersson, Malmo (SE); Oskar Erik Frode Styrbjorn Fallman, Lund (SE); Per-Olof Borgqvist, Lund (SE); Sophie Sandblad, Lund (SE)

(73) Assignees: Baxter International Inc., Deerfield, IL (US); Baxter Healthcare SA, Glattpark (CH)

( * ) Notice: Subject to any disclaimer, the term of this patent is extended or adjusted under 35 U.S.C. 154(b) by 355 days.

(21) Appl. No.: 18/147,133

(22) Filed: Dec. 28, 2022

(65) Prior Publication Data

US 2023/0248889 A1    Aug. 10, 2023

Related U.S. Application Data

(60) Provisional application No. 63/294,172, filed on Dec. 28, 2021.

(51) Int. Cl.
*A61M 1/28* (2006.01)
*A61M 1/36* (2006.01)

(52) U.S. Cl.
CPC .............. *A61M 1/28* (2013.01); *A61M 1/282* (2014.02); *A61M 1/287* (2013.01); *A61M 1/369* (2013.01); *A61M 2205/36* (2013.01)

(58) Field of Classification Search
CPC ........ A61M 1/28; A61M 1/282; A61M 1/287; A61M 1/369; A61M 2205/36
See application file for complete search history.

(56) References Cited

U.S. PATENT DOCUMENTS

2017/0281847 A1    10/2017    Manda et al.
2019/0125954 A1    5/2019    Mathiot

FOREIGN PATENT DOCUMENTS

EP    3335742 A1    6/2018

OTHER PUBLICATIONS

International Search Report (ISA/210); International Application No. PCT/US2022/082452; Apr. 14, 2023.

(Continued)

*Primary Examiner* — John Kim
(74) *Attorney, Agent, or Firm* — K&L Gates LLP

(57) ABSTRACT

A peritoneal dialysis ("PD") system includes a plurality of PD fluid components, a reusable PD fluid line selectively fluidly communicating with the PD fluid components, a source of PD fluid selectively fluidly communicating with the reusable PD fluid line, a source of anti-scaling fluid selectively fluidly communicating with the reusable PD fluid line, and a control unit configured to (i) operate the plurality of PD fluid components during treatment using PD fluid from the source heated to a treatment temperature, and (ii) circulate unused PD fluid heated to a disinfection temperature in combination with anti-scaling fluid from the source of anti-scaling fluid after treatment for disinfecting the plurality of PD fluid components and the reusable PD fluid line, the anti-scaling fluid provided in an amount configured to lower the pH of the unused PD fluid to a level below which precipitates are formed and above which the pH causes disinfection.

19 Claims, 1 Drawing Sheet

(56) References Cited

OTHER PUBLICATIONS

Written Opinion of the International Searching Authority (ISA/237); International Application No. PCT/US2022/082452; Apr. 14, 2023.
Notification of Transmittal of the International Preliminary Report on Patentability; International Application No. PCT/US2022/082452; Nov. 29, 2023.

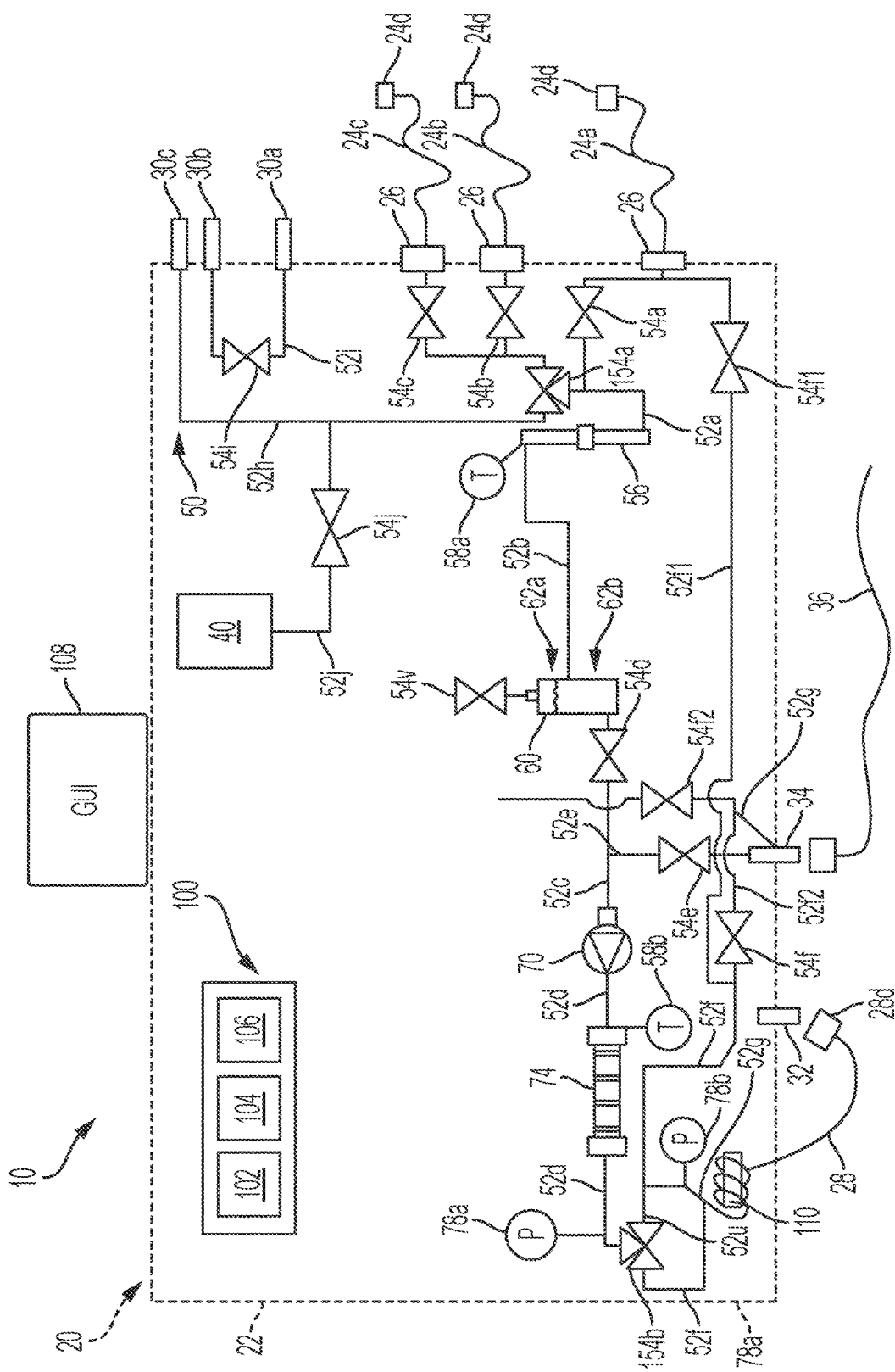

PERITONEAL DIALYSIS CYCLER HAVING DECREASED pH DISINFECTION

PRIORITY CLAIM

This application claims priority to and the benefit as a non-provisional application of U.S. Provisional Patent Application No. 63/294,172 filed Dec. 28, 2021, the entire contents of which are hereby incorporated by reference and relied upon.

BACKGROUND

The present disclosure relates generally to medical fluid treatments and in particular to dialysis fluid treatments.

Due to various causes, a person's renal system can fail. Renal failure produces several physiological derangements. It is no longer possible to balance water and minerals or to excrete daily metabolic load. Toxic end products of metabolism, such as, urea, creatinine, uric acid and others, may accumulate in a patient's blood and tissue.

Reduced kidney function and, above all, kidney failure is treated with dialysis. Dialysis removes waste, toxins and excess water from the body that normal functioning kidneys would otherwise remove. Dialysis treatment for replacement of kidney functions is critical to many people because the treatment is lifesaving.

One type of kidney failure therapy is Hemodialysis ("HD"), which in general uses diffusion to remove waste products from a patient's blood. A diffusive gradient occurs across the semi-permeable dialyzer between the blood and an electrolyte solution called dialysate or dialysis fluid to cause diffusion.

Hemofiltration ("HF") is an alternative renal replacement therapy that relies on a convective transport of toxins from the patient's blood. HF is accomplished by adding substitution or replacement fluid to the extracorporeal circuit during treatment. The substitution fluid and the fluid accumulated by the patient in between treatments is ultrafiltered over the course of the HF treatment, providing a convective transport mechanism that is particularly beneficial in removing middle and large molecules.

Hemodiafiltration ("HDF") is a treatment modality that combines convective and diffusive clearances. HDF uses dialysis fluid flowing through a dialyzer, similar to standard hemodialysis, to provide diffusive clearance. In addition, substitution solution is provided directly to the extracorporeal circuit, providing convective clearance.

Most HD, HF, and HDF treatments occur in centers. A trend towards home hemodialysis ("HHD") exists today in part because HHD can be performed daily, offering therapeutic benefits over in-center hemodialysis treatments, which occur typically bi- or tri-weekly. Studies have shown that more frequent treatments remove more toxins and waste products and render less interdialytic fluid overload than a patient receiving less frequent but perhaps longer treatments. A patient receiving more frequent treatments does not experience as much of a down cycle (swings in fluids and toxins) as does an in-center patient, who has built-up two or three days' worth of toxins prior to a treatment. In certain areas, the closest dialysis center can be many miles from the patient's home, causing door-to-door treatment time to consume a large portion of the day. Treatments in centers close to the patient's home may also consume a large portion of the patient's day. HHD can take place overnight or during the day while the patient relaxes, works or is otherwise productive.

Another type of kidney failure therapy is peritoneal dialysis ("PD"), which infuses a dialysis solution, also called dialysis fluid, into a patient's peritoneal cavity via a catheter. The dialysis fluid is in contact with the peritoneal membrane in the patient's peritoneal cavity. Waste, toxins and excess water pass from the patient's bloodstream, through the capillaries in the peritoneal membrane, and into the dialysis fluid due to diffusion and osmosis, i.e., an osmotic gradient occurs across the membrane. An osmotic agent in the PD dialysis fluid provides the osmotic gradient. Used or spent dialysis fluid is drained from the patient, removing waste, toxins and excess water from the patient. This cycle is repeated, e.g., multiple times.

There are various types of peritoneal dialysis therapies, including continuous ambulatory peritoneal dialysis ("CAPD"), automated peritoneal dialysis ("APD"), tidal peritoneal dialysis ("TPD") and continuous flow peritoneal dialysis ("CFPD"). CAPD is a manual dialysis treatment. Here, the patient manually connects an implanted catheter to a drain to allow used or spent dialysis fluid to drain from the peritoneal cavity. The patient then switches fluid communication so that the patient catheter communicates with a bag of fresh PD fluid to infuse the fresh PD fluid through the catheter and into the patient. The patient disconnects the catheter from the fresh PD fluid bag and allows the dialysis fluid to dwell within the peritoneal cavity, wherein the transfer of waste, toxins and excess water takes place. After a dwell period, the patient repeats the manual dialysis procedure, for example, four times per day. Manual peritoneal dialysis requires a significant amount of time and effort from the patient, leaving ample room for improvement.

APD is similar to CAPD in that the dialysis treatment includes drain, fill and dwell cycles. APD machines, however, perform the cycles automatically, typically while the patient sleeps. APD machines free patients from having to manually perform the treatment cycles and from having to transport supplies during the day. APD machines connect fluidly to an implanted catheter, to one or more bag(s) of fresh PD fluid and to a fluid drain. APD machines pump fresh PD fluid from a dialysis fluid source, through the catheter and into the patient's peritoneal cavity. APD machines also allow for the dialysis fluid to dwell within the chamber and for the transfer of waste, toxins and excess water to take place. The source may include multiple liters of dialysis fluid including several solution bags.

APD machines pump used or spent dialysate from the patient's peritoneal cavity, though the catheter, to drain. As with the manual process, several drain, fill and dwell cycles occur during dialysis. A "last fill" may occur at the end of the APD treatment. The last fill fluid may remain in the peritoneal cavity of the patient until the start of the next treatment, or may be manually emptied at some point during the day.

In any of the above modalities using an automated machine, the automated machine operates typically with a disposable set, which is discarded after a single use. Depending on the complexity of the disposable set, the cost of using one set per day may become significant. Also, daily disposables require space for storage, which can become a nuisance for home owners and businesses. Moreover, daily disposable replacement requires daily setup time and effort by the patient or caregiver at home or at a clinic.

For each of the above reasons, it is desirable to provide an APD machine that reduces disposable waste.

SUMMARY

Known automated peritoneal dialysis ("APD") systems typically include a machine or cycler that accepts and actuates a pumping cassette having a hard part and a soft part that is deformable for performing pumping and valving operations. The hard part is attached to tubes that extend to various bags. The disposable cassette and associated tubes and bags can be cumbersome for a patient at home to load for treatment. The overall amount of disposable items may also lead to multiple setup procedures requiring input from the patient, which can expose room for error.

The present APD system and associated methodology of the present disclosure, on the other hand, converts much of the fluid carrying portions of its peritoneal dialysis ("PD") system into reusable components, which are disinfected after treatment. Fluid lines within the machine or cycler are reused. Disposable items remaining may include a drain line leading to a drain bag or house drain and one or more dialysis fluid container or bag, such as different dextrose or glucose level peritoneal dialysis fluid containers and a last bag container, e.g., containing icodextrine. In an embodiment, a disposable filter is placed at the distal end of the patient line to provide a final stage of PD fluid filtration prior to delivery to the patient.

The APD system of the present disclosure incudes a PD cycler having a housing. At least one and perhaps three or more reusable PD fluid lines extend from the housing. When not connected to PD fluid containers or bags, the reusable PD fluid lines can be connected to disinfection connectors supported and provided by the housing. The reusable PD fluid lines may for example extend from a front of the housing and connect to disinfection connectors also provided at the front of the housing for ready access to the PD fluid lines. The reusable PD fluid lines may be color coded and/or keyed to match a colored or keyed connector of the PD fluid container or bag. The containers or bags may hold different dextrose or glucose level dialysis fluids, such as 1.36% glucose dialysis fluid, 2.27% glucose dialysis fluid, 3.86% glucose dialysis fluid, and/or a last bag of a different formulation of PD fluid, such as icodextrin. The containers or bags may additionally hold fluids other than PD fluids, such nutritional fluids.

Inside the housing, reusable tubing runs from each of the reusable dialysis fluid lines, through a dialysis fluid line valve for each dialysis fluid line to a dialysis fluid inline heater. In an embodiment, each of the valves of the PD cycler is an electrically actuated valve having a reusable valve body that occludes (e.g., when unpowered) or allows (e.g., when powered) PD fluid to flow through the body. The valves may alternatively be bistable valves. The PD fluid inline heater is also electrically actuated in one embodiment and is, for example, a resistive heater having a reusable heater body that accepts PD fluid for heating. The inline heater in an embodiment is able to heat PD fluid from room temperature to body temperature, e.g., 37° C., at a flowrate of at least 200 milliliters ("ml")/minute. A temperature sensor is located adjacent to the heater, e.g., downstream from the heater to provide feedback for temperature control. It is also contemplated to place a second temperature sensor upstream of the heater for feedforward control, which stabilizes and speeds the responsiveness of the heating control. The second sensor may also provide useful information for calculating disinfection dose values, e.g., AO values, for use during disinfection.

Reusable tubing runs from the outlet of the PD fluid inline heater to an air trap in one embodiment. Any of the tubing inside the housing of the cycler may be metal, e.g., stainless steel, or plastic, e.g., polyvinylchloride ("PVC") or a non-PVC material, such as polyethylene ("PE"), cross-linked polyethylene ("PEX"), polyurethane ("PU"), polyether ether ketone ("PEEK"), or polycarbonate ("PC"). In an embodiment, one or more level sensor is located adjacent the air trap so that a desired level or range of levels of PD fluid is maintained in the air trap. An air trap valve is located downstream from the air trap in an embodiment, so that the air trap may be closed downstream to fill the air trap. The air trap may be closed upstream by the dialysis fluid line valves for draining. A vent valve may also be provided at the top of the air trap.

A reusable PD fluid pump is located within the cycler housing and includes a reusable pump body that accepts PD fluid for pumping. That is, the pump does not require the PD fluid to flow within a disposable item, such as a tube or cassette. The PD fluid pump may be an electrically operated piston, gear, membrane or centrifugal pump, which may be inherently volumetrically accurate so that a separate PD fluid volume measurement apparatus, such as a flowmeter, balance chamber or an apparatus using the ideal gas law, is not needed. The PD fluid pump is controllable to pump to and from the patient at or within a pressure limit by controlling a level of current to, or the speed of, the PD fluid pump. A positive patient pressure limit may for example be one to five psig (e.g., two psig (14 kPa)). A negative patient pressure limit may for example be −1.0 psig to −3.0 psig (e.g., −1.3 psig (−9 kPa)). The PD fluid pump may be bidirectional or unidirectional, and a single pump may be provided. The PD fluid pump may also be continuous.

In an embodiment, a conductivity sensor is located adjacent to the PD fluid pump. The conductivity sensor may be used to detect the conductivity of the fresh PD fluid to make sure that it is of a prescribed type, e.g., of a prescribed glucose or dextrose level. The conductivity sensor may be used to detect the conductivity of the fresh PD fluid to make sure that it has been mixed correctly, e.g., if an online PD fluid source is connected instead of a PD fluid container to one of the reusable PD fluid lines. A temperature sensor is located near the conductivity sensor so that the conductivity reading can be temperature compensated.

One or more patient line valve(s) is/are located in an embodiment between the conductivity sensor and a reusable patient line. The patient line valve(s) selectively allow(s) fresh PD fluid to flow in a fresh PD fluid lumen of a dual lumen reusable patient line, while the other of the parallel patient line valves selectively allows used PD fluid to flow in a used PD fluid lumen of the dual lumen reusable patient line. One or more pressure sensor is located in proximity to the parallel patient line valves to enable positive and negative patient pressures to be monitored and controlled. A patient line connector extends from the PD cycler housing and accepts the dual lumen reusable patient line during disinfection and generally while the patient is not undergoing treatment. A disinfection line located inside the PD cycler housing extends from the patient line connector to the at least one disinfection connector. At least one disinfection line valve is located along the disinfection line to selectively open the disinfection line to run a disinfection sequence. The valves of the present disclosure may be two-way valves, three-way valves or combinations of same.

The drain line is disposable in one embodiment and connects to a drain line connector extending from the housing of the PD cycler during treatment. After treatment, the drain line is removed and discarded. The drain line connector is configured to close or be closed against the outside world when the drain line is removed. The drain line connector includes dual lumens or dialysis fluid pathways that enable disinfection fluid, e.g., heated and used PD fluid, to flow into and out of the drain line connector during disinfection. One lumen or pathway of the drain line connector is placed in selective fluid communication via a first drain line valve with the PD fluid pump. The other lumen or pathway of the drain line connector is placed in selective fluid communication via a second valve with the disinfection line.

In one embodiment, a spool or hose reel is located within the housing. The hose reel is configured to automatically retract the reusable patient line when the patient line is connected to the patient line connector. The spool includes a releasable lock that the user opens to allow the spool to coil the patient line. Until the lock is released or opened, the patient line remains uncoiled from the spool so that the spool does not pull on the reusable patient line during treatment.

An additional pressure sensor may be located on the suction side of the PD fluid pump (from a patient filling standpoint) to sense the inlet negative pressure to the pump. The additional pressure sensor is also useful to detect an empty or almost empty PD fluid container or bag and may therefore be used alternatively or in addition to the flow switch. The output from the additional pressure sensor may also be used in determining a volume of PD fluid pumped in a pump stroke for PD fluid pumps that depend on incoming pressure for accuracy.

The PD cycler of the PD system of the present disclosure includes a control unit having one or more processor and one or more memory that receives signals or outputs from the pressure sensors, temperature sensors, the conductivity sensor, and potentially other sensors and process the signals or outputs as feedback. The control unit uses pressure feedback to control the PD fluid pump to run at safe patient pressure limits during treatment and safe system limits during disinfection. The control unit uses temperature feedback to control the dialysis fluid heater to heat the fresh PD fluid to, e.g., body temperature. The control unit uses the temperature compensated conductivity readings to analyze fresh PD fluid for the reasons discussed herein.

The control unit also opens and closes the dialysis fluid valves in combination with the PD fluid pump and heater to run a priming sequence, a patient fill sequence, a patient drain sequence and a disinfection sequence after a PD treatment, wherein each of the at least one reusable PD fluid line is connected to one of the at least one disinfection connectors, and wherein the reusable patient line is connected to the reusable patient line connector. The disinfection sequence readies the PD cycler for the next treatment. In an embodiment, unused fresh PD fluid is heated after the final drain and is used for disinfection.

If the unused PD fluid does not contain bicarbonate, then the PD fluid even when heated for disinfection, does not form precipitation or scaling. Using unused fresh PD fluid containing bicarbonate for disinfection however presents the risk of forming precipitation, especially when the fluid is heated for disinfection. Precipitates like magnesium carbonate ($MgCO_3$) and calcium carbonate ($CaCO_3$) can form because the precipitates have reverse solubilities at elevated disinfection temperatures and with increased pH. If the unused PD fluid used for disinfection contains bicarbonate, the dissolved carbon dioxide ($CO_2$) gas is less soluble and tends to evaporate, which has the effect of raising the pH of the solution.

To avoid the precipitation, which among other outcomes, may cause the PD fluid pump to malfunction (e.g., become stuck or slow to respond), the PD system of the present disclosure causes a small amount of acid, such as citric acid, to be injected into the PD disinfection fluid. The small amount of acid lowers the pH of the unused fresh PD fluid, for example, to at or below pH 6.5, such as to pH 4 to 6 or 2 to 6. In an embodiment, the pH lowering is performed only during disinfection, not during treatment, so that during treatment the patient receives the prescribed PD fluid.

Lowering the pH causes the risk of forming precipitation or scaling to be minimized significantly. PD fluid pH level is the main chemical driver for creating precipitation. While citric acid is used on one embodiment, the anti-scaling fluid or acid could instead include hydrochloric acid (HCl), white vinegar, ascorbic acid (e.g., at a disinfection temperature below 85° C.), acetic acid, lactic acid, other suitable acids, and a mixture of acids, such as the ones listed above. The addition of the anti-scaling fluid or acid may be added to the unused PD fluid just prior to and/or during disinfection. It is contemplated for the cycler of the system of the present disclosure to (i) include a reusable container that holds the anti-scaling fluid or acid, (ii) make a determination whether or not the PD fluid to be used for disinfection includes bicarbonate, and (iii) if so, use the anti-scaling fluid to prevent the formation of precipitates or scaling. Because the pH only needs to be lowered to around 6.5 or slightly less, such as to pH 4 to 6 or 2 to 6, the container may be of a compact size and still hold many treatment's worth of anti-scaling fluid or acid. Reducing the pH in the typical case for disinfection to 2 or 2.5 would require more acid and thus a larger container.

In light of the disclosure set forth herein, and without limiting the disclosure in any way, in a first aspect of the present disclosure, which may be combined with any other aspect, or portion thereof, a peritoneal dialysis ("PD") system includes a housing; a plurality of PD fluid components housed by the housing; at least one reusable PD fluid line in fluid communication with the plurality of PD fluid components; a source of PD fluid in valved fluid communication with the at least one reusable PD fluid line; a source of anti-scaling fluid in valved fluid communication with the at least one reusable PD fluid line; and a control unit configured to (i) cause the plurality of PD fluid components to be operated during treatment using PD fluid from the source of PD fluid, the PD fluid heated to a treatment temperature, and (ii) cause unused PD fluid heated to a disinfection temperature after treatment to be circulated in combination with anti-scaling fluid from the source of anti-scaling fluid for disinfecting the plurality of PD fluid components and the at least one reusable PD fluid line, the anti-scaling fluid provided in an amount configured to lower the pH of the unused PD fluid to a level below which precipitates are formed and at or above a pH of 4.

In a second aspect of the present disclosure, which may be used with any other aspect, or portion thereof, the control unit is configured to cause at least a portion of the anti-scaling fluid to be combined with the unused PD fluid after treatment and prior to heating the unused PD fluid to the disinfection temperature.

In a third aspect of the present disclosure, which may be used with any other aspect, or portion thereof, the control unit is configured to cause at least a portion of the anti-scaling fluid to be combined with the unused PD fluid after treatment and while heating the unused PD fluid to the disinfection temperature.

In a fourth aspect of the present disclosure, which may be used with any other aspect, or portion thereof, the control unit is configured to cause at least a portion of the anti-scaling fluid to be combined with the unused PD fluid after heating the unused PD fluid to the disinfection temperature.

In a fifth aspect of the present disclosure, which may be used with any other aspect, or portion thereof, the anti-scaling fluid is an acid, such as citric acid.

In a sixth aspect of the present disclosure, which may be used with any other aspect, or portion thereof, the treatment temperature is about 37° C. and the disinfection temperature is 70° C. to 95° C.

In a seventh aspect of the present disclosure, which may be used with any other aspect, or portion thereof, the pH of the unused PD fluid prior to lowering is higher than 6.5, such as at least 8.0.

In an eighth aspect of the present disclosure, which may be used with any other aspect, or portion thereof, the lowered pH level is 6.5 or slightly lower.

In a ninth aspect of the present disclosure, which may be used with any other aspect, or portion thereof, the plurality of PD fluid components includes a PD fluid pump, the control unit configured to operate the pump to pump the PD fluid and the anti-scaling fluid.

In a tenth aspect of the present disclosure, which may be used with any other aspect, or portion thereof, the plurality of PD fluid components includes a PD fluid heater, the control unit configured to operate the PD fluid heater to heat the PD fluid to the treatment temperature and the unused PD fluid to the disinfection temperature.

In an eleventh aspect of the present disclosure, which may be used with any other aspect, or portion thereof, the PD system includes a valve and a redundant valve under control of the control unit, the valve and the redundant valve providing the valved fluid communication located between the source of anti-scaling fluid and the at least one reusable PD fluid line.

In a twelfth aspect of the present disclosure, which may be used with any other aspect, or portion thereof, a peritoneal dialysis ("PD") system includes a plurality of PD fluid components; at least one reusable PD fluid line in fluid communication with the plurality of PD fluid components; a source of PD fluid in valved fluid communication with the at least one reusable PD fluid line; a source of anti-scaling fluid in valved fluid communication with the at least one reusable PD fluid line; and a control unit configured to (i) cause the plurality of PD fluid components to be operated during treatment using PD fluid from the source of PD fluid, the PD fluid heated to a treatment temperature, (ii) determine whether unused PD fluid from the source to be used for disinfection includes bicarbonate, and (iii) if the unused PD fluid from the source to be used for disinfection includes bicarbonate, cause the unused PD fluid heated to a disinfection temperature after treatment to be circulated in combination with anti-scaling fluid from the source of anti-scaling fluid for disinfecting the plurality of PD fluid components and the at least one reusable PD fluid line.

In a thirteenth aspect of the present disclosure, which may be used with any other aspect, or portion thereof, in the PD system of the twelfth aspect, (ii) occurs before or after (i).

In a fourteenth aspect of the present disclosure, which may be used with any other aspect, or portion thereof, the anti-scaling fluid is provided in an amount configured to lower the pH of the unused PD fluid to a level below which precipitates are formed and above which the pH causes disinfection.

In a fifteenth aspect of the present disclosure, which may be used with any other aspect, or portion thereof, the control unit is configured to cause at least a portion of the anti-scaling fluid to be combined with the unused PD fluid after treatment and prior to heating the unused PD fluid to the disinfection temperature.

In a sixteenth aspect of the present disclosure, which may be used with any other aspect, or portion thereof, the control unit is configured to cause at least a portion of the anti-scaling fluid to be combined with the unused PD fluid after treatment and while heating the unused PD fluid to the disinfection temperature.

In a seventeenth aspect of the present disclosure, which may be used with any other aspect, or portion thereof, the control unit is configured to cause at least a portion of the anti-scaling fluid to be combined with the unused PD fluid after heating the unused PD fluid to the disinfection temperature.

In an eighteenth aspect of the present disclosure, which may be used with any other aspect, or portion thereof, the control unit is further configured, such that if the unused PD fluid from the source to be used for disinfection does not include bicarbonate, the unused PD fluid heated to a disinfection temperature after treatment is circulated without combining the anti-scaling fluid for disinfecting the plurality of PD fluid components and the at least one reusable PD fluid line.

Summary

In a nineteenth aspect of the present disclosure, which may be used with any other aspect, or portion thereof, determining whether unused PD fluid from the source to be used for disinfection including bicarbonate includes determining a type of PD fluid to be used for disinfection.

In light of the above aspects and the disclosure herein, it is an advantage of the present disclosure to provide an automated peritoneal dialysis ("APD") cycler that reuses many components, which may otherwise be disposable, which lowers treatment cost.

It is another advantage of the present disclosure to provide an PD cycler having fluid handling components that accept peritoneal dialysis fluid directly without having to operate with a disposable item, such as a tube or flexible sheeting, which reduces user interaction.

It is a further advantage of the present disclosure to provide an PD cycler that uses unused treatment fluid during disinfection, while avoiding the buildup of precipitation or scaling.

It is yet another advantage of the present disclosure to provide disinfection using an already available disinfection fluid.

It is yet a further advantage of the present disclosure to automatically dose the anti-scaling fluid or acid.

It is still another advantage of the present disclosure to provide an anti-scaling or precipitation regime that uses the anti-scaling fluid in small amounts, such that a relatively small container of the fluid lasts for many treatments.

It is still a further advantage of the present disclosure, to provide an anti-scaling fluid or acid that removes precipitation or scaling formed during treatment, while the PD fluid is at a treatment fluid temperature.

Additional features and advantages are described in, and will be apparent from, the following Detailed Description and the Figure. The features and advantages described herein are not all-inclusive and, in particular, many additional features and advantages will be apparent to one of ordinary skill in the art in view of the figure and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE FIGURES

FIG. 1 is a perspective view of one embodiment of an ("APD") cycler and associated system of the present disclosure.

DETAILED DESCRIPTION

PD Fluid System

Referring now to the drawings and in particular to FIG. 1, peritoneal dialysis ("PD") system 10 and associated methodology of the present disclosure includes a PD machine or cycler 20. System 10 and cycler 20 attempt to eliminate disposable items as much as possible and instead provide the majority of its fluid carrying portions as reusable components, which are disinfected after treatment. Fluid lines within the machine or cycler are reused. In particular, FIG. 1 illustrates that cycler 20 includes a housing 22 from which reusable peritoneal dialysis ("PD") fluid lines 24a to 24c extend from apertures 26 defined or provided by the housing. Apertures 26 may be fitted with grommets or be otherwise sealed, such that dust, fluids and other substances cannot enter housing 22 from the environment. FIG. 1 further illustrates that a reusable patient line 28 also extends from housing 22 of cycler 20 via a sealed aperture, e.g., fitted with a grommet. As discussed in detail below, reusable patient line 28, which is typically longer than reusable PD fluid lines 24a to 24c, may be coiled or rolled up within housing via a spool or hose reel 110 when reusable patient line 28 is not connected to a patient for treatment.

When not connected to PD fluid containers or bags, the reusable PD fluid lines 24a to 24c and patient line 28 can be connected to dedicated connectors supported and provided by the housing. The reusable PD fluid and patient lines may for example extend from a front of the housing and connect to connectors also provided at the front of the housing for ready access to the PD fluid and patient lines. In the illustrated embodiment, distal ends 24d of reusable PD fluid lines 24a to 24c releasably attach in a fluid-tight manner to disinfection connectors 30a to 30c, respectively, provided at housing 22. Distal end 28d of reusable patient line 28 releasably attaches in a fluid-tight manner to patient line connector 32 provided at housing 22. Disinfection connectors 30a to 30c and patient line connector 32 are configured in one embodiment to close or shut automatically when reusable PD fluid lines 24a to 24c and reusable patient line 28, respectively, are not connected to the connectors.

FIG. 1 also illustrates that housing 22 provides a drain line connector 34, which may be releasably covered by a moveable, e.g., rotatable or slideable cover. Drain line connector 34 receives a disposable drain line 36 for treatment, which may run to a drain container or bag or to a house drain. In an alternative embodiment, drain line 36 is reusable and is connected to a disinfection loop discussed herein.

Although not illustrated in FIG. 1, system 10 also includes disposable PD fluid or solution containers or bags for connection to reusable PD fluid lines 24a to 24c. Distal ends 24d of reusable PD fluid lines 24a to 24c may be color coded and/or keyed to match a colored or keyed connector of a dedicated PD fluid container or bag. The containers or bags may hold different dextrose or glucose level dialysis fluids, such as 1.36% glucose dialysis fluid, 2.27% glucose dialysis fluid, 3.86% glucose dialysis fluid, and/or a last bag of a different formulation of PD fluid, for example, icodextrin. It may also be possible for the PD fluid containers or bags to hold a glucose level between the regulatory approved glucose levels, e.g., between 1.36% glucose and 3.86% glucose.

It should be appreciated that any number of reusable PD fluid lines and PD fluid containers or bags may be provided, including a single reusable PD fluid line and PD fluid container, or more than one reusable PD fluid lines and PD fluid containers. In a further alternative embodiment, the PD fluid containers or bags are replaced by an online PD fluid generation source, which connects to and communicates fluidly with a single reusable PD fluid line. System 10 may also be configured to operate with either prefilled PD fluid containers or bags or an online PD fluid generation source.

It is contemplated for any of reusable PD fluid lines 24a to 24c, reusable patient line 28, disinfection connectors 30a to 30c, patient line connector 32, drain line connector 34, and drain line 36 to be made of any one or more plastic, e.g., polyvinylchloride ("PVC") or a non-PVC material, such as polyethylene ("PE"), polyurethane ("PU"), polyether ether ketone ("PEEK") or polycarbonate ("PC"). Certain of the components, such as disinfection connectors 30a to 30c, may be made of, e.g., stainless steel or titanium.

As illustrated in FIG. 1, cycler 20 includes reusable tubing 52a that runs from each reusable PD fluid line 24a to 24c, through a PD fluid line valve 54a to 54c, respectively, to a PD fluid inline heater 56. Valves 54b and 54c communicate fluidly and selectively with reusable tubing 52a via a three-way valve 154a.

In an embodiment, each of the valves of the PD cycler, including PD fluid line valves 54a to 54c, three-way valve 154a, and all other valves discussed herein, is an electrically actuated valve having a reusable valve body that occludes (e.g., when unpowered for fail safe operation) or allows (e.g., when powered) PD fluid to flow through the body. PD fluid inline heater 56 is also electrically actuated in one embodiment and is, for example, a resistive heater having a reusable heater body that accepts PD fluid for treatment and disinfection heating. Inline heater 56 in an embodiment is able to heat PD fluid from room temperature or colder (e.g., if the PD fluid is stored in a cold environment) to body temperature, e.g., 37° C., at a flowrate of at least 200 milliliters (ml)/minute (lower flowrates may also be achieved, e.g., for children or infants). A temperature sensor 58a is located adjacent to heater 56, e.g., downstream from the heater to provide feedback for temperature control. If desired, a second temperature sensor (not illustrated) may be provided upstream from heater 56 to enable the incoming temperature of fresh PD fluid to be taken into account for the heating algorithm or routine, that is, to provide feedforward control, which stabilizes and speeds the responsiveness of the overall heating control. The second sensor may also provide useful information for calculating disinfection dose values, e.g., AO values, for use during disinfection.

In an embodiment, reusable tubing 52b runs from the outlet of PD fluid inline heater 56 to an air trap 60. Any of the reusable tubing inside the housing of cycler 20, including reusable tubes 52a and 52b, may be made of metal, e.g., stainless steel or plastic, e.g., silicone, polyvinylchloride ("PVC") or a non-PVC material, such as polyethylene ("PE"), polyurethane ("PU"), polyether ether ketone ("PEEK") or polycarbonate ("PC"). In an embodiment, one or more level sensor 62a and 62b is located adjacent air trap 60 so that a desired level or range of levels of PD fluid is maintained in the air trap. Vent valve 54v is provided at the top of air trap 60 to allow air and/or carbon dioxide to be vented from the air trap during filling and to enter the air trap during draining. Although not illustrated, vent valve 54v may be provided with or operate with a vent filter, e.g., a hydrophobic filter, which prevents dialysis fluid from escaping when vent valve 54v is open, and which sterile filters the air entering air trap 60 to avoid contamination. Vent valve 54v may also be opened to allow the level of dialysis fluid within air trap 60 to be adjusted.

Reusable tubing 52c runs between air trap valve 54d and a PD fluid pump 70 located within housing 22 of cycler 20. PD fluid pump 70 in one embodiment includes a reusable pump body that accepts PD fluid for pumping. That is, pump 70 does not require the PD fluid to flow within a disposable item, such as a tube or cassette. The reusable pump body of pump 70 itself accepts the PD fluid. PD fluid pump 70 may be of a type that is inherently volumetrically accurate so that a separate PD fluid volume measurement apparatus, such as flowmeter, a balance chamber or an apparatus using the ideal gas law, is not needed. PD fluid pump 70 may be an electrically operated piston or membrane pump. PD fluid pump 70 may alternatively be a less accurate gear or centrifugal pump that does operate with a separate PD fluid volume measurement apparatus. PD fluid pump 70 is controllable to pump to and from the patient at or within a pressure limit by controlling a level of current to the PD fluid pump. A positive patient pressure limit may for example be one to five psig (e.g., two psig (14 kPa). A negative patient pressure limit may for example be −1.0 psig to −3.0 psig (e.g., −1.3 psig (−9 kPa)). Pump 70 is also capable of supplying pressures of lower magnitude if needed, e.g., for small children or babies. PD fluid pump 70 is bidirectional and continuous in one embodiment, such that a single pump may be provided and used for pumping the anti-scaling fluid discussed herein.

In the illustrated embodiment of FIG. 1, a conductivity sensor 74 is located along a reusable line or tubing 52d adjacent to PD fluid pump 70. Conductivity sensor 74 is used to detect the conductivity of fresh PD fluid to make sure that it is of a prescribed type, e.g., of a prescribed glucose or dextrose level. Conductivity sensor 74 may alternatively or additionally be used to detect the conductivity of the fresh PD fluid to make sure that it has been mixed correctly, e.g., if an online PD fluid source is connected instead to one of the reusable PD fluid lines 24a to 24c. A temperature sensor 58b is located near conductivity sensor 74 in the illustrated embodiment, so that the conductivity reading from the sensor may be temperature compensated.

FIG. 1 further illustrates that reusable line or tubing 52d extends to a second three-way valve 154b, which is toggled differently depending on whether fresh or used PD fluid is being pumped. In one toggled state, three-way valve 154b allows fresh PD fluid to be pumped through reusable fresh PD fluid line 52f and a fresh PD fluid lumen of the dual lumen reusable patient line 28 to the patient. In a second toggled state, three-way valve 154b allows used PD fluid to be pumped from the patient, through a used PD fluid lumen of dual lumen reusable patient line 28, and through reusable used PD fluid line 52u. A first pressure sensor 78a is located along reusable line or tubing 52d to enable positive, fresh PD fluid fill pressures to be monitored and controlled.

A second pressure sensor 78b is located along or is in fluid communication with used PD fluid line 52u to enable negative, used PD fluid drain pressures to be monitored and controlled. First pressure sensor 78a may also be used to measure used PD fluid drain pressures, e.g., for redundancy and increased accuracy. A reusable drain line 52e extends from reusable tubing or line 52c to drain line connector 34 for delivering used PD fluid pumped by PD fluid pump 70, running in reverse, to drain line 36. A drain line valve 54e is located along reusable drain line 52e.

A reusable disinfection tube or line 52f is located inside housing 22 of PD cycler 20 and extends from used PD fluid line 52u and splits at valve 54f into reusable disinfection line branches 52f1 and 52f2. Reusable disinfection line branch 52f1 extends all the way to a tee junction in fluid communication with PD fluid line valve 54a. A disinfection line branch valve 54f1 is located along reusable disinfection line branch 52f1 for disinfection fluid control through the line. Reusable disinfection line branch 52f2 extends to form a vent line to atmosphere, which is controlled by a disinfection line branch valve 54f2. If vent valve 54e is provided at air trap 60, reusable disinfection line branch 52f2 may extend instead to an upper portion of the air trap. In some embodiments, reusable disinfection line branch 52f2 and disinfection line branch valve 54f2 are omitted.

A recirculation line 52g also extends from reusable disinfection line branch 52f2. Recirculation line 52g extends to drain line connector 34. The two reusable lines 52e and 52g extending to drain line connector 34 allow disinfection fluid to be recirculated through drain line connector 34 during disinfection, e.g., with disinfection line branch valve 54f2 closed and disposable drain line 36 removed. Similarly, patient line connector 32 extends from the PD cycler housing and accepts dual lumen reusable patient line 28 during disinfection and generally while the patient is not undergoing treatment. Patient line connector 32 is provided with an internal U-turn or 180° turn to allow disinfection fluid to flow from one of the dual lumens to the other of the dual lumens of the dual lumen patient line during disinfection.

Cycler 20 includes an additional reusable disinfection line 52h, which extends from one leg of three-way valve 154a to disinfection connector 30c. A further reusable disinfection line 52i extends from disinfection connector 30b to disinfection connector 30a. A disinfection connector valve 54i is located along reusable disinfection line 52i to selectively allow the flow of disinfection fluid between disinfection connectors 30a and 30b during disinfection.

Reusable PD fluid lines 24a to 24c connected respectively to disinfection connectors 30a to 30c, reusable line or tubing 52a, the reusable body of PD fluid inline heater 56, reusable line or tubing 52b, reusable air trap 60, reusable line or tubing 52c, the reusable pump body of PD fluid pump 70, reusable line or tubing 52d including conductivity sensor 74, reusable tubing or lines 52f and 52u, reusable dual lumen patient line 28 connected to patient line connector 32, capped drain line connector 34, and disinfection lines 52f, 52f1, 52f2, 52g, 52h and 52i together form a disinfection loop 50 that allows a disinfection fluid, e.g., heated used PD fluid, to contact all internal reused surfaces continuously over a timed disinfection sequence to provide proper disinfection.

In the illustrated embodiment, cycler 20 of system 10 further includes an anti-scaling fluid or citric acid source 40, which is placed in selective fluid communication with disinfection line 52h via a citric acid line 52j and a valve 54j located along the citric acid line. In the illustrated embodiment, three-way valve 154a is toggled so as to be closed towards citric acid source 40 during treatment, providing a second, protective valve that additionally ensures that no anti-scaling fluid, e.g., citric acid, leaks into the treatment fluid pathway of cycler 20 during treatment. It should also be appreciated viewing FIG. 1 that during treatment, reusable PD fluid line 24c is disconnected from disinfection connector 30c, such that even if citric acid valve 54j leaks, no anti-scaling fluid can enter the treatment fluid pathway of cycler 20 via disinfection connector 30c and reusable PD fluid line 24c. Anti-scaling fluid or citric acid source 40 may be located in alternative locations relative to disinfection loop 50, however, it is important in one embodiment to have redundant valves between source 40 and any lines or components used during treatment.

It is possible that PD fluid pump 70 is precise enough to handle the very small amount of citric acid that is metered at a given time into disinfection loop 50. Although not illustrated, if needed a small, accurate, citric acid metering pump may be located along citric acid line 52j to meter a precise amount of citric acid into disinfection loop 50 as discussed in detail herein. The citric acid metering pump may for example be a small piston pump. While citric acid is used on one embodiment, the anti-scaling fluid or acid could instead include hydrochloric acid (HCl), white vinegar, ascorbic acid (e.g., at a disinfection temperature below 85° C.), acetic acid, lactic acid, other suitable acids, and a mixture of acids, such as the ones listed above. It should also be appreciated that disinfection loop 50 may be configured in many different ways with different valve arrangements, different components, etc. Each different configuration would likely however provide an anti-scaling fluid source 40 and possibly an associated anti-scaling fluid metering pump. Anti-scaling fluid source 40 may for example be sized to hold a liter of anti-scaling fluid. The liter of anti-scaling fluid is sized to be used over many treatments, such as 500 daily treatments as shown below.

FIG. 1 further illustrates that PD cycler 20 of system 10 of the present disclosure includes a control unit 100 having one or more processor 102 and one or more memory 104 that receive, store and process signals or outputs from the pressure sensors 78a and 78b, temperature sensors 58a and 58b, conductivity sensor 74 and other sensors or switches, such as a flow switch that ensures flow for powering inline heater 74. Control unit 100 uses pressure feedback to control dialysis fluid pump 70 to pump fresh and used PD fluid at safe patient and system pressure limits. In an embodiment, control unit knows how much fresh or used PD fluid, and a flowrate for same, by counting and accumulating known volume pump strokes. Control unit 100 would also control the anti-scaling fluid metering pump if provided, which could run open loop as it is likely the metering pump is inherently accurate and the volume of anti-scaling fluid is known. Control unit 100 uses temperature feedback to control inline dialysis fluid heater 56 to heat the fresh PD fluid to, e.g., body temperature, and to heat disinfection fluid to a desired disinfection temperature, such as 70° C. to 95° C. Control unit 100 uses temperature compensated conductivity readings, for example, to analyze fresh PD fluid to make sure it is of a prescribed type or glucose level. Control unit 100 also opens and closes dialysis fluid valves 54a to 54f, 54/1, 54/2, 54h, and 54j in combination with the operation of dialysis fluid pump 70 and heater 56 to run a priming sequence, multiple patient fill sequences, multiple patient drain sequences, and a disinfection sequence after a PD treatment.

Control unit 100 may also include a video controller 106 that interfaces with a user interface 108, which may include a display screen operating with a touchscreen and/or one or more electromechanical button, such as a membrane switch. User interface 108 may also include one or more speaker for outputting alarms, alerts and/or voice guidance commands. User interface 108 may be provided with cycler 20 as illustrated in FIG. 1 and/or be a remote user interface operating with control unit 100. Control unit 100 may also include a transceiver (not illustrated) and a wired or wireless connection to a network, e.g., the internet, for sending treatment data to and receiving prescription instructions from a doctor's or clinician's server interfacing with a doctor's or clinician's computer.

Anti-Scaling Fluid (e.g., Citric Acid) Infused Disinfection

As mentioned above, in the disinfection sequence, each reusable PD fluid line 24a to 24c is connected to disinfection connectors 30a to 30c, respectively, reusable patient line 28 is connected to reusable patient line connector 32a, and drain line connector 34 is covered or capped by a cover. The disinfection sequence readies PD cycler 20 for the next treatment. In an embodiment, unused fresh PD fluid is heated after the final drain of a treatment and is used as the disinfection fluid for disinfection. There are multiple benefits to using unused fresh PD fluid as the disinfection fluid. First, the PD fluid is already available, for example, so no separate water connection is needed, and no extra patient steps to connect a separate disinfection fluid source are needed. The fresh PD fluid is also sterile.

It is contemplated for control unit 100 to know which type of fresh PD fluid is being used for treatment, and which type of PD fluid is being used for disinfection. Control unit 100 may also be programmed to know which PD fluids contain bicarbonate and which do not. Control unit 100 is therefore able to determine whether or not to add citric acid according to the present disclosure based on whether or not the PD fluid to be used for disinfection includes bicarbonate. If the PD fluid to be used for disinfection includes bicarbonate, then control unit 100 causes citric acid or other anti-scaling fluid to be dosed into the unused fresh PD in the manner(s) discussed herein. If the PD fluid to be used for disinfection does not include bicarbonate, then control unit 100 does not cause the anti-scaling fluid to be dosed, in which case, anti-scaling fluid within source or container 40 is preserved.

One hurdle with using unused PD fluid containing bicarbonate as disinfection fluid is that the PD fluid may contain substances and ions, for example, those of calcium, magnesium, sodium, potassium, chloride, acetate, lactate, bicarbonate and possibly other substances. Such substances may form scale on the critical parts of disinfection loop 50, for example, inside PD fluid pump 70. The most commonly formed scale and precipitate is from calcium carbonate ($CaCO_3$) because it has inverse solubility relative to temperature. The pH of the PD fluid that may be used for disinfection is likely higher than 6.5 and may be higher than 8.0 according to EUROPEAN PHARMACOPOEIA 9.6 (01/2019:0862)). A PD fluid containing bicarbonate at this high pH will precipitate/scale quickly as its temperature is increased by inline heater 56. There is accordingly a need to adjust the PD fluid used for heat disinfection. System 10 of the present disclosure in an embodiment adds a relatively small amount, e.g., a few droplets, of citric acid or other anti-scaling fluid into the PD fluid flowing through disinfection loop 50 during heat disinfection and perhaps just prior to heating the PD fluid for disinfection. Lowering the pH using citric acid is not done to a level that aids disinfection. The pH drop is instead lowered to a level that avoids scaling and precipitation, e.g., down to around pH 6.5 or less, such as pH 4 to 6 or 2 to 6. At a pH in such range, calcium (up to 1.75 mM), magnesium (up to 0.25 mM) and carbonate solution remain stable even at elevated disinfection temperatures.

Where citric acid is used as the anti-scaling fluid in source or container 40, the citric acid lowers the pH of the disinfection fluid (as an acid, gives away one or more proton) and also (via the citrate ion) acts as a complex binder that lowers the risk of calcium carbonate and magnesium carbonate precipitation by creating a water soluble complex with calcium and magnesium. The anti-scaling agent, e.g., citric acid, may also remove precipitation or scaling that has occurred during treatment, while the fresh PD fluid is at body temperature or 37° C. Reaction 1 shows a reaction for how an acid (H+) reacts with $CaCO_3$.

$$CaCO_3(s)+2[H+](aq)=>[Ca_2+](aq)+CO2(aq)+H_2O(l) \quad \text{Reaction 1:}$$

To arrive at a desired pH of 6.5 or lower, such as pH 4 to 6 or 2 to 6, for system 10, the Langelier Saturation Index ("LSI") was used. The LSI was calculated and used to predict when a risk for precipitation/scale-forming system 10 would arise. For the calculation, a worst case scenario was used in which a bicarbonate containing PD fluid marketed as Physioneal™ P35 by the assignee of the present disclosure was modeled. The solution yielded the following input data:
- conductivity of 12 mS/cm (higher conductivity gives better results, so 12 mS/cm is assumed to be worst case);
- bicarbonate concentration, ($HCO_3$), 25 mmol/L+ 5%=26.25 mmol/L;
- calcium concentration, (Ca), 1.75 mmol/L+5%=1.84 mmol/L;
- lactate concentration, ($CH_3CH(OH)COO^-$) 10 mmol/L— 5%=9.5 mmol/L;
- disinfection temperature of 79° C.; and
- pH variable (range investigated)→pH of 6.3 to 7 (pH has been varied the worst case parameters listed above fixed to understand effect of pH behavior, results listed in Table 2 below.)

Table 1 shows additional input data for the fresh PD fluid tested (Physioneal™ P35] Table 2 shows outputs from the calculations

TABLE 1 input data for the pH calculation
Physioneal P35

| Substance | Nominal concentration (mmol/L) | Concentration worst case (mmol/L) |
|---|---|---|
| Sodium | 132 | 133.1 |
| Calcium | 1.75 | 1.84 |
| Magnesium | 0.25 | 0.25 |
| Chloride | 101 | 101 |
| Bicarbonate | 25 | 26.25 |
| Lactate | 10 | 9.5 |
| Ionic strength | not calculated | 139.1 |
| Ionic strength set to | N/A | 140 |
| pH without citric acid | 8.01 (result from calculation without addition of citric acid). The pH should be set to 8 prior to addition of citric acid to have worst case-nothing need to be done (e.g. addition of NaOH) as pH already is 8.01 | N/A |

TABLE 2

LSI as a function of pH (pH varied) using the worst set-up of the other parameters.

| Inputted pH | Outcome, results |
|---|---|
| 7 "worst case" | pHs = 6.5<br>LSI = 0.49<br>comments from computer program ("CP"): Water is supersaturated with respect to calcium carbonate ($CaCO_3$) and scale forming may occur.<br>→Slightly scale forming and corrosive. |
| 6.8 worst case | pHs = 6.5<br>LSI = 0.29<br>CP: Water is supersaturated with respect to calcium carbonate ($CaCO_3$) and scale forming may occur.<br>→Slightly scale forming and corrosive. |
| 6.6 worst case | pHs = 6.5<br>LSI = 0.092<br>CP: Water is supersaturated with respect to calcium carbonate ($CaCO_3$) and scale forming may occur.<br>→Slightly scale forming and corrosive. |
| 6.5 worst case | pHs = 6.5<br>LSI = −0.0078<br>CP: Water is undersaturated with respect to calcium carbonate. Undersaturated water has a tendency to remove existing calcium carbonate protective coatings in pipelines and equipment.<br>→ Slightly corrosive but non-scale forming. |
| 6.3 worst case | pHs = 6.5<br>LSI = −0.21<br>CP: Water is undersaturated with respect to calcium carbonate. Undersaturated water has a tendency to remove existing calcium carbonate protective coatings in pipelines and equipment.<br>→ Slightly corrosive but non-scale forming. |

Table 2 illustrates that the LSI calculations invoke only calcium and not magnesium. As described herein, however, both calcium and magnesium found in the PD fluid form precipitate/scale in the presence of carbonate. When both calcium and magnesium are in a solution at the same time, however, there is a competition between them for the carbonate ion. So here, invoking only calcium in the calculation is worst case approach. Notably, the solubility of magnesium carbonate is higher than calcium carbonate, namely, 0.1 g/l vs 0.00015 g/l, thus if calcium carbonate is formed, it quickly starts forming precipitates. Table 2 also illustrates that a pH of 6.5 is the highest pH, requiring the least amount of anti-scaling fluid, e.g., citric acid, to yield a solution that is non-scale or precipitation forming. Lower pH's, such as pH 4 to 6 or 2 to 6, are also suitable for system 10.

The amount of citric acid needed to achieve a pH of 6.5 is calculated as follows. Assuming again a fresh PD fluid used for disinfection having an ionic strength of 140 mmol/L and a sodium bicarbonate concentration of 26.25 mmol/L (that is +5%), lactate concentration of 9.5 mmol/L (that is −5%) and a pH of higher than 6.5, such as 8.0 or higher (maximum higher limit according to pharmacopeia) (see Table 1 for input data), the PD fluid would require the addition of approximately 0.0034 mol/L citric acid to reach a pH of 6.5 (see Table 3).

Assuming also a total internal volume for disinfection loop 50 of 300 ml (could be more or less), the required volume for a 10 wt % liquid citric acid (10 wt % citric acid=104 g citric acid and 937 grams RO water for one liter) is 1.7 ml ($C_{concentrate,\ 0.54\ mol/L} * V_{concentrate} = C_{fluid\ path,\ 0.003\ mol/l} * V_{fluid\ path,\ 300\ ml}$). 10 wt % citric acid is chosen because it requires no safety equipment for the patient. That is, the patient may readily handle 10 wt % citric acid concentration, e.g., change containers 40 of same, without fear of harm from being contacted by such solution. It should be appreciated however that a more concentrated citric acid, e.g., even up to 50 wt % or more (55%) may be used instead to provide an antimicrobial effect, where container 40, and the exchange of same, are configured to mitigate against patient or user contact with the citric acid. Higher concentrations of citric acid would lower the volume of citric acid needed and allow container 40 to be smaller.

Assuming container 40 holds a volume of one liter of 10 wt % liquid citric acid, assuming 2 ml each treatment and assuming a treatment/cleaning every day, container 40 would last for 500 treatments/days. The assumption of using 2 ml of citric acid per treatment is based on the PD disinfection fluid having an ionic strength of 140 mmol/l and a sodium bicarbonate concentration of 26.25 mmol/l, lactate concentration of 9.5 mmol/L, and a normal (without the addition of ant-scaling fluid) pH of 8, which would require the addition of approximately 0.0034 mol/L citric acid to reach a pH of 6.5 (see Table 3). The volume of 10 wt % citric acid would then be approximately 2 ml.

Table 3 shows pH as a result of calculations performed for the addition of citric acid to the worst case scenario set of inputs described above.

| Citric acid (M) | pH |
| --- | --- |
| 0 | 8.01 |
| 4.0E−04 | 7.48 |
| 1.2E−03 | 7.00 |
| 2.1E−03 | 6.71 |
| 3.4E−03 | 6.50 |
| 4.0E−03 | 6.33 |
| 6.2E−03 | 6.00 |
| 1.5E−02 | 4.97 |
| 4.0E−02 | 4.09 |
| 1.9E−01 | 2.99 |
| 0.465 | 2.50 |
| 1.0E+00 | 2.12 |

Table 3: shows the output pH as a function of how much citric acid is infused M or moles per liter Table 3 shows that a molarity at or between 3.00E−03 M and 4.00E−03 leads to a resulting disinfection PD fluid pH of 6.5 or slightly lower. Hence the 0.0034 mol/L citric acid used above to determine how much citric acid is needed per treatment.

Control unit 100 in an embodiment sends a message to a central location when it determines that the citric acid or other anti-scaling fluid in container 40 is running low so that new citric acid may be ordered and delivered. User interface 108 may also provide an audio, visual or audiovisual message to the patient that the anti-scaling fluid is running low but that a new supply is on the way. Upon receiving the new supply, user interface 108 may also provide audio, visual or audiovisual instructions to the patient as to how to transfer the new supply into reusable container 40 or to replace reusable container 40 with a new container.

Any acid used for the anti-scaling fluid will create carbon dioxide ($CO_2$) gas due to a reaction between bicarbonate and the acid. Maintaining a higher pH generates less $CO_2$ gas, enabling pressure developments, e.g., spikes, to be milder and system 10 to be more robust. It is contemplated that the use of a higher pH fluid during heat disinfection allows the material compliance of disinfection loop 50 to resist the increased pressure. Air trap 60 and vent valve 54v may also help to accommodate the production of $CO_2$ gas.

System 10 takes into account pressure accumulation due to the production of $CO_2$ gas, for example, because increased pressure may affect the performance of PD fluid pump 70, e.g., a piston pump. There are two primary chemical reactions that form $CO_2$ gas within disinfection loop 50. Reaction 2 below occurs between bicarbonate and citric acid ($C_6H_8O_7$). Reaction 3 below between calcium carbonate ($CaCO_3$) and citric acid likely only occurs to a minor extent. Reaction 2 is the dominate reaction, which is very fast, and is the only one considered for the $CO_2$ gas pressure building analysis. In Reaction 2, the amount of citric acid (the three acidic protons) are consumed as the concentration of citric acid is smaller than that of bicarbonate (e.g., citric acid: bicarbonate ($3*3*10^{-3}$: 0.02625)).

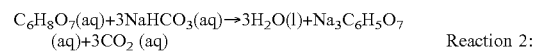

Reaction 2:

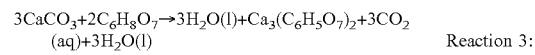

Reaction 3:

In evaluating the effect of $CO_2$ gas formation, the volume increase due to the gas formation is calculated. Here, the ideal gas law ($PV=nRT$) is applied. For ambient conditions:
temperature (T)=298.15 K and at heat disinfection temperature (273.15+85=358.15 K, which is a common temperature used during heat disinfection;
pressure (P)=101325 Pa;
number of moles=n, moles of citric acid protons in disinfection loop 50 the system $3*3*10^{-3}*0.3$ (volume of the 0.3 L)=0.0027 mol (or $H_2CO_3$, $8.461*10^{-3}$ mol/L*0.3 L=0.0025 mol) ($H_2CO_3$ is not stable and will transform to $CO_2+2H^+$); and
R=general gas constant, 8.134 $m^3$ Pa·$K^{-1}$ $mol^{-1}$.

Applying the ideal gas law, 2.5 mmol of $CO_2$ gas creates a pressure relative to the compliance of disinfection loop 50 (e.g., flexibility of the fluid path), resulting in the following additional volume needed assuming that all formed $CO_2$ is in the gas phase (at high temperature like disinfection most of the $CO_2$(aq) (dissolved) will be $CO_2$(g)):
At room temperature: V=0.0025*8.314*(298.15)/101325=$6.6*10^{-5}$ $m^3$=66 ml.)
At disinfect temperature: V=0.0025*8.314*(358.15)/101325=$7.9*10^{-5}$ $m^3$=79 ml.

A portion of the 79 ml of $CO_2$ generation (which, it should be appreciated, is a worst case scenario) may be vented through valve 54v and/or delivered to drain, wherein drain line 36 is attached during an initial portion of disinfection, and wherein that portion of the disinfection sequence is when the anti-scaling fluid or citric acid is added and the $CO_2$ is generated. The $CO_2$ does not have to be completely vented, just managed so that the corresponding pressure increases is limited. For comparison, citric acid used for disinfection typically requires a solution pH of 2.5. Using (i) the concentration for citric acid needed to achieve a solution pH of 2.5 (citric acid 0.465 mol/l, see table 3), (ii) a concentration of carbonic acid (H2CO3) of 0.02624 mol/L, and (iii) a heated disinfection fluid temperature, yields $V=0.02624*0.3*8.314*(358.15)/101325=230$ ml of extra volume needed for the creation of $CO_2$ gas. The extra volume needed for a solution pH of 2.5 is accordingly roughly three times that of a solution pH of about 6.5 used in the present application. Using lower pH's for system 10 of the present disclosure, such as 4 to 6 or 2 to 6, would produce more $CO_2$, but still considerably less than a disinfection pH of 2.5.

It is contemplated for control unit 100 of system 10 to cause PD fluid pump 70 (or a separate micropump) to inject the, e.g., 2 ml at 10 wt % citric acid concentration, of anti-scaling fluid or citric acid at the end of treatment (i) all at once prior to or at the beginning of heating the PD fluid for disinfection via heater 56, or (ii) some portion, e.g., half, prior to or at the beginning of heating the PD fluid for disinfection, and the remaining portion during disinfection at the disinfection temperature, e.g., the remaining balance at once during disinfection or distributed in even amounts over multiple intervals during disinfection. In a further alternative embodiment, control unit 100 may cause PD fluid pump 70 (or a separate micropump) to inject even fractions, e.g., 0.1 ml to 0.2 ml fractions, of anti-scaling fluid or citric acid over multiple intervals dividing the entire disinfection process, including the heating of the disinfection fluid and the circulating of the disinfection fluid at the desired disinfection temperature for a programmed disinfection time.

At the end of disinfection, it is further contemplated for control unit 100 to cause PD fluid pump 70 to flush disinfection loop 50 with further unused PD fluid that has not been injected with the anti-scaling fluid. The flush may be performed however because the glucose in the PD fluid might not be acceptable from a Glucose Degradation Product ("GDP") perspective after being heated to the disinfection temperature. In one alternative embodiment, control unit 100 instead causes the flush to be performed at the beginning of the next treatment. In another alternative embodiment, control unit 100 instead causes disinfection loop 50 to be drained after disinfection such that cycler 20 is left disinfected and dry until the next treatment.

It should also be understood that other changes and modifications to the presently preferred embodiments described herein are covered by the appended claims. It is therefore intended that such changes and modifications be covered by the appended claims. For example, while the drain line is illustrated and described as being disposable, the drain line may alternatively be reusable, wherein an additional disinfection connector is provided for the drain line to connect the drain line to the disinfection loop for the disinfection sequence.

The invention is claimed as follows:

1. A peritoneal dialysis ("PD") system comprising:
a housing;
a plurality of PD fluid components housed by the housing;
at least one reusable PD fluid line in fluid communication with the plurality of PD fluid components;
a source of PD fluid in valved fluid communication with the at least one reusable PD fluid line;
a source of anti-scaling fluid in valved fluid communication with the at least one reusable PD fluid line;
a control unit configured to (i) cause the plurality of PD fluid components to be operated during treatment using PD fluid from the source of PD fluid, the PD fluid heated to a treatment temperature, and (ii) cause unused PD fluid heated to a disinfection temperature after treatment to be circulated in combination with anti-scaling fluid from the source of anti-scaling fluid for disinfecting the plurality of PD fluid components and the at least one reusable PD fluid line, the anti-scaling fluid provided in an amount configured to lower the pH of the unused PD fluid to a level below which precipitates are formed and at or above a pH of 4; and
a valve and a redundant valve under control of the control unit, the valve and the redundant valve providing the valved fluid communication located between the source of anti-scaling fluid and the at least one reusable PD fluid line.

2. The PD system of claim 1, wherein the control unit is configured to cause at least a portion of the anti-scaling fluid to be combined with the unused PD fluid after treatment and prior to heating the unused PD fluid to the disinfection temperature.

3. The PD system of claim 1, wherein the control unit is configured to cause at least a portion of the anti-scaling fluid to be combined with the unused PD fluid after treatment and while heating the unused PD fluid to the disinfection temperature.

4. The PD system of claim 1, wherein the control unit is configured to cause at least a portion of the anti-scaling fluid to be combined with the unused PD fluid after heating the unused PD fluid to the disinfection temperature.

5. The PD system of claim 1, wherein the anti-scaling fluid is an acid.

6. The PD system of claim 1, wherein the treatment temperature is about 37° C. and the disinfection temperature is between 70° C. to 95° C.

7. The PD system of claim 1, wherein the pH of the unused PD fluid prior to pH lowering is higher than 6.5.

8. The PD system of claim 1, wherein the lowered pH level is 6.5 or slightly lower.

9. The PD system of claim 1, wherein the plurality of PD fluid components includes a PD fluid pump, the control unit configured to operate the pump to pump the PD fluid and the anti-scaling fluid.

10. The PD system of claim 1, wherein the plurality of PD fluid components includes a PD fluid heater, the control unit configured to operate the PD fluid heater to heat the PD fluid to the treatment temperature and the unused PD fluid to the disinfection temperature.

11. The PD system of claim 1, wherein the anti-scaling fluid is provided in an amount configured to lower the pH of the unused PD fluid to a level at a pH between 4 and 6.

12. A peritoneal dialysis ("PD") system comprising:
a plurality of PD fluid components;
at least one reusable PD fluid line in fluid communication with the plurality of PD fluid components;
a source of PD fluid in valved fluid communication with the at least one reusable PD fluid line;
a source of anti-scaling fluid in valved fluid communication with the at least one reusable PD fluid line; and a control unit configured to
  (i) cause the plurality of PD fluid components to be operated during treatment using PD fluid from the source of PD fluid, the PD fluid heated to a treatment temperature,
  (ii) determine whether unused PD fluid from the source to be used for disinfection includes bicarbonate, and
  (iii) when the unused PD fluid from the source to be used for disinfection includes bicarbonate, cause the unused PD fluid heated to a disinfection temperature after treatment to be circulated in combination with anti-scaling fluid from the source of anti-scaling fluid for disinfecting the plurality of PD fluid components and the at least one reusable PD fluid line.

13. The PD system of claim 12, wherein (ii) occurs before or after (i).

14. The PD system of claim 12, wherein the anti-scaling fluid is provided in an amount configured to lower the pH of the unused PD fluid to a level below which precipitates are formed and above which the pHl causes disinfection.

15. The PD system of claim 12, wherein the control unit is configured to cause at least a portion of the anti-scaling fluid to be combined with the unused PD fluid after treatment and prior to heating the unused PD fluid to the disinfection temperature.

16. The PD system of claim 12, wherein the control unit is configured to cause at least a portion of the anti-scaling fluid to be combined with the unused PD fluid after treatment and while heating the unused PD fluid to the disinfection temperature.

17. The PD system of claim 12, wherein the control unit is configured to cause at least a portion of the anti-scaling fluid to be combined with the unused PD fluid after heating the unused PD fluid to the disinfection temperature.

18. The PD system of claim 12, wherein the control unit is further configured, such that when the unused PD fluid from the source to be used for disinfection does not include bicarbonate, the unused PD fluid heated to a disinfection temperature after treatment is circulated without combining the anti-scaling fluid for disinfecting the plurality of PD fluid components and the at least one reusable PD fluid line.

19. The PD system of claim 12, wherein determining whether unused PD fluid from the source to be used for disinfection includes including bicarbonate includes determining a type of PD fluid to be used for disinfection.

* * * * *